US010050577B2

(12) United States Patent
Nakano et al.

(10) Patent No.: US 10,050,577 B2
(45) Date of Patent: Aug. 14, 2018

(54) VEHICLE COOLING-FAN MOTOR/INVERTER SYSTEM, CONTROL METHOD THEREFOR, AND PROGRAM THEREFOR

(71) Applicant: MITSUBISHI HEAVY INDUSTRIES THERMAL SYSTEMS, LTD., Minato-ku, Tokyo (JP)

(72) Inventors: Koji Nakano, Tokyo (JP); Atsushi Suzuki, Kiyosu (JP); Hiroyuki Kamitani, Kiyosu (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 0 days.

(21) Appl. No.: 14/764,891

(22) PCT Filed: Aug. 29, 2013

(86) PCT No.: PCT/JP2013/073079
§ 371 (c)(1),
(2) Date: Jul. 30, 2015

(87) PCT Pub. No.: WO2014/128997
PCT Pub. Date: Aug. 28, 2014

(65) Prior Publication Data
US 2015/0365039 A1    Dec. 17, 2015

(30) Foreign Application Priority Data

Feb. 22, 2013  (JP) .................................. 2013-033581

(51) Int. Cl.
*G05B 11/28* (2006.01)
*H02P 27/08* (2006.01)
(Continued)

(52) U.S. Cl.
CPC ......... *H02P 27/08* (2013.01); *B60H 1/00428* (2013.01); *B60H 1/00828* (2013.01);
(Continued)

(58) Field of Classification Search
CPC ...... H02P 21/06; H02P 23/08; H02P 2207/01; H02P 21/085; H02M 5/271
(Continued)

(56) References Cited

U.S. PATENT DOCUMENTS 4,667,480 A * 5/1987 Bessler ................ B60H 1/3205
                                                318/254.1
5,825,972 A * 10/1998 Brown .................. H02P 7/2913
                                                388/811
(Continued)

FOREIGN PATENT DOCUMENTS

CN    101635556 A    1/2010
CN    101652544 A    2/2010
(Continued)

OTHER PUBLICATIONS

Decision to Grant a Patent dated Aug. 25, 2016 in corresponding Japanese Patent Application No. 2013-033581 with an English Translation.
(Continued)

*Primary Examiner* — Rina Duda
(74) *Attorney, Agent, or Firm* — Birch, Stewart, Kolasch & Birch, LLP

(57) ABSTRACT

Included are: a motor control device that has a switching element, that converts DC power supplied from a high-voltage power supply into three-phase AC power, and that supplies the three-phase AC power to a three-phase motor; a first control portion that controls the motor control device; an isolated-type CAN driver that is activated by using power supplied from a low-voltage power supply and that
(Continued)

exchanges information with a vehicle ECU that is mounted in the vehicle and that is superordinate to a vehicle cooling-fan motor/inverter system; and an isolation portion that electrically isolates a low-voltage system to which power is supplied from the low-voltage power supply from a high-voltage system to which power is supplied from the high-voltage power supply. If a fault in the switching element is detected, the first control portion outputs fault information notifying that there is a fault in control of the three-phase motor to the vehicle ECU via the isolated-type CAN driver.

3 Claims, 2 Drawing Sheets

(51) Int. Cl.
    *F01P 7/04*     (2006.01)
    *B60H 1/00*     (2006.01)
    *F04D 27/00*     (2006.01)
    *F04D 25/06*     (2006.01)
    *F04D 25/08*     (2006.01)

(52) U.S. Cl.
    CPC .................. *F01P 7/04* (2013.01); *F01P 7/048* (2013.01); *F04D 25/06* (2013.01); *F04D 25/08* (2013.01); *F04D 27/004* (2013.01)

(58) Field of Classification Search
    USPC .................. 318/139, 599, 811, 461, 800, 801
    See application file for complete search history.

(56) References Cited

U.S. PATENT DOCUMENTS

| | | | | |
|---|---|---|---|---|
| 5,963,442 A | * | 10/1999 | Yoshida | B60L 1/00 318/801 |
| 6,646,411 B2 | * | 11/2003 | Hirono | H02P 3/18 318/757 |
| 7,764,044 B2 | * | 7/2010 | Ishikawa | B60K 6/445 307/45 |
| 7,977,900 B2 | * | 7/2011 | Nakagami | H02J 9/005 318/139 |
| 8,004,221 B2 | * | 8/2011 | Nakano | B60H 1/00428 318/139 |
| 2006/0018636 A1 | * | 1/2006 | Watanabe | F02D 11/107 388/804 |
| 2006/0120903 A1 | * | 6/2006 | Iwasaki | F01P 7/048 417/423.1 |
| 2007/0181356 A1 | | 8/2007 | Ando et al. | |
| 2007/0273204 A1 | * | 11/2007 | Kodama | B60K 6/48 303/146 |
| 2008/0234897 A1 | * | 9/2008 | Tsuchida | B60W 50/029 701/42 |
| 2010/0155162 A1 | * | 6/2010 | Nakamura | B60L 11/187 180/65.29 |
| 2012/0153880 A1 | | 6/2012 | Cerrato et al. | |

FOREIGN PATENT DOCUMENTS

| | | |
|---|---|---|
| CN | 102536867 A | 7/2012 |
| JP | 2001-20741 A | 1/2001 |
| JP | 2005-69160 A | 3/2005 |
| JP | 2006-182114 A | 7/2006 |
| JP | 2007-251828 A | 9/2007 |
| JP | WO2009/107836 A1 | 9/2009 |
| JP | 4839109 B2 | 12/2011 |

OTHER PUBLICATIONS

Chinese Office Action and Chinese Search Report, dated Jan. 4, 2017, for Chinese Application No. 201380073185.2, with English translations.

* cited by examiner

VEHICLE COOLING-FAN MOTOR/INVERTER SYSTEM, CONTROL METHOD THEREFOR, AND PROGRAM THEREFOR

TECHNICAL FIELD

The present invention relates to a vehicle cooling-fan motor/inverter system, a control method therefor, and a program therefor.

BACKGROUND ART

In the related art, a fan control apparatus for controlling an in-vehicle heat-exchanger cooling fan is put under the control of a vehicle ECU (Electronic Control Unit), and, in control of the cooling fan, the motor rotation speed is controlled based on the duty ratio of a PWM (pulse width moduration) signal output from the vehicle ECU.

The motor rotation speed is controlled based on a vehicle speed, an engine coolant temperature, and an AC pressure. While the air conditioner is on, an air-conditioner ECU calculates the necessary fan control based on a pressure signal for the air conditioner and a vehicle-speed signal received from the vehicle and outputs the result as a signal to the vehicle ECU. The vehicle ECU adds, to that signal, the vehicle speed and the engine coolant temperature to determine the rotation speed of a fan motor and outputs a fan-driving PWM signal. On the other hand, while the air conditioner is off, the vehicle ECU determines the fan rotation speed based on the vehicle speed and the engine coolant temperature and outputs a fan-driving PWM signal.

SUMMARY OF INVENTION

Technical Problem

In such a vehicle system configuration, there is a problem in that, even when a fault has occurred in a single-phase motor that drives the cooling fan, a PWM signal is just sent unidirectionally from the vehicle ECU to the fan control apparatus, and, since a communication tool is not provided between the fan control apparatus and the vehicle ECU, it is impossible to discover, at the vehicle, the fault in the fan motor. Furthermore, there is a problem in that using a single-phase motor for the fan motor is inefficient, and a 12V battery is consumed more, thus increasing the workload involved in managing the 12V battery.

The present invention has been made to solve the above-described problems, and an object thereof is to provide a vehicle cooling-fan motor/inverter system, a control method therefor, and a program therefor that are capable of driving a fan motor with high efficiency and detecting, at the vehicle, a fault in the fan motor.

Solution to Problem

In order to solve the above-described problems, the present invention adopts the following solutions.

According to a first aspect, the present invention provides a vehicle cooling-fan motor/inverter system that controls a three-phase motor that drives a cooling fan for supplying air to an in-vehicle heat exchanger, including: a motor control device that has a switching element, that converts DC power supplied from a high-voltage power supply into three-phase AC power, and that supplies the three-phase AC power to the three-phase motor; a first control unit that controls the motor control device; a communication control unit that is activated by using power supplied from a low-voltage power supply and that exchanges information with a second control unit that is mounted in a vehicle and that is superordinate to the vehicle cooling-fan motor/inverter system; and an isolation unit that electrically isolates a low-voltage system to which power is supplied from the low-voltage power supply from a high-voltage system to which power is supplied from the high-voltage power supply, in which, if a fault in the switching element is detected, the first control unit outputs fault information notifying that there is a fault in control of the three-phase motor to the second control unit via the communication control unit.

According to this configuration, when the motor control device, which has the switching element, which converts DC power supplied from the high-voltage power supply into three-phase AC power, and which supplies the three-phase AC power to the three-phase motor, is controlled by the first control unit, and, if a fault in the switching element of the motor control device is detected, the first control unit notifies the second control unit that a fault has occurred in the switching element via the communication control unit connected to the second control unit, which is mounted in the vehicle and which is superordinate to the vehicle cooling-fan motor/inverter system. Furthermore, the low-voltage system is electrically isolated from the high-voltage system, thereby ensuring the safety of passengers (who ride the vehicle) against a high voltage.

In this way, if a fault in the motor control device is detected, fault information is notified to the vehicle via the communication control unit; therefore, it is possible to detect, at the vehicle, a fault in the three-phase motor, which drives the cooling fan, and to assist in identifying the cause of the fault. Furthermore, by using the three-phase motor to drive the cooling fan, it is possible to achieve low-loss and high-efficiency driving. Furthermore, to drive the three-phase motor, power is supplied from the high-voltage power supply (for example, 200 to 400 (V)); thus, compared with a case in which power is supplied from the low-voltage power supply, which is a low-capacity battery (for example, 12(V)) of the vehicle, there is no need to worry about battery consumption.

Here, the switching element is a power transistor formed of a semiconductor device, and, for example, a MOSFET (Metal-Oxide-Semiconductor Field-Effect Transistor), a bipolar transistor, an IGBT (Insulated Gate Bipolar Transistor), or the like is used. Furthermore, an Si (Silicon)-based semiconductor or an SiC (Silicon Carbide)-based semiconductor is used as a semiconductor material.

In the above-described vehicle cooling-fan motor/inverter system, it is possible to further include a PWM control unit that is activated by using power supplied from the low-voltage power supply, that performs PWM (pulse width modulation) control in response to a duty, and that controls the switching element of the motor control device, in which the first control unit may obtain a rotation-speed instruction for the three-phase motor via at least one of the PWM control unit and the communication control unit.

According to this configuration, the three-phase motor for the cooling fan enables control that is performed based on a PWM duty via the PWM control unit and control that is performed via the communication control unit of the vehicle.

In the above-described vehicle cooling-fan motor/inverter system, it is possible to further include a measurement unit that measures and outputs at least one of a temperature value, a current value, and a voltage value of the switching element of the motor control device, in which the first control unit may include a determination unit that determines whether there is a fault in the switching element based on at least one of the temperature value, the current value, and the voltage value obtained from the measurement unit.

According to this configuration, because whether there is a fault is determined based on the temperature value, the current value, and the voltage value of the switching element, it is possible to assist in identifying the cause of the fault.

According to a second aspect, the present invention provides a control method for a vehicle cooling-fan motor/inverter system that controls a three-phase motor that drives a cooling fan for supplying air to an in-vehicle heat exchanger, the vehicle cooling-fan motor/inverter system including: a motor control device that has a switching element, that converts DC power supplied from a high-voltage power supply into three-phase AC power, and that supplies the three-phase AC power to the three-phase motor; a first control unit that controls the motor control device; a communication control unit that is activated by using power supplied from a low-voltage power supply and that exchanges information with a second control unit that is mounted in a vehicle and that is superordinate to the vehicle cooling-fan motor/inverter system; and an isolation unit that electrically isolates a low-voltage system to which power is supplied from the low-voltage power supply from a high-voltage system to which power is supplied from the high-voltage power supply, the control method including outputting, if a fault in the switching element is detected, fault information notifying that there is a fault in control of the three-phase motor to the second control unit via the communication control unit.

According to a third aspect, the present invention provides a control program for a vehicle cooling-fan motor/inverter system that controls a three-phase motor that drives a cooling fan for supplying air to an in-vehicle heat exchanger, the vehicle cooling-fan motor/inverter system including: a motor control device that has a switching element, that converts DC power supplied from a high-voltage power supply into three-phase AC power, and that supplies the three-phase AC power to the three-phase motor; a first control unit that controls the motor control device; a communication control unit that is activated by using power supplied from a low-voltage power supply and that exchanges information with a second control unit that is mounted in a vehicle and that is superordinate to the vehicle cooling-fan motor/inverter system; and an isolation unit that electrically isolates a low-voltage system to which power is supplied from the low-voltage power supply from a high-voltage system to which power is supplied from the high-voltage power supply, the control program including outputting, if a fault in the switching element is detected, fault information notifying that there is a fault in control of the three-phase motor to the second control unit via the communication control unit.

Advantageous Effects of Invention

According to the present invention, an advantageous effect is afforded in that it is possible to drive the fan motor with high efficiency and to detect, at the vehicle, a fault in the fan motor.

DESCRIPTION OF EMBODIMENT

A vehicle cooling-fan motor/inverter system, a control method therefor, and a program therefor according to one embodiment of the present invention will be described below with reference to the drawings.

In this embodiment, a description will be given of an example case in which the vehicle cooling-fan motor/inverter system is applied to a three-phase motor that drives a cooling fan for supplying air to an in-vehicle heat exchanger.

Figure 1:
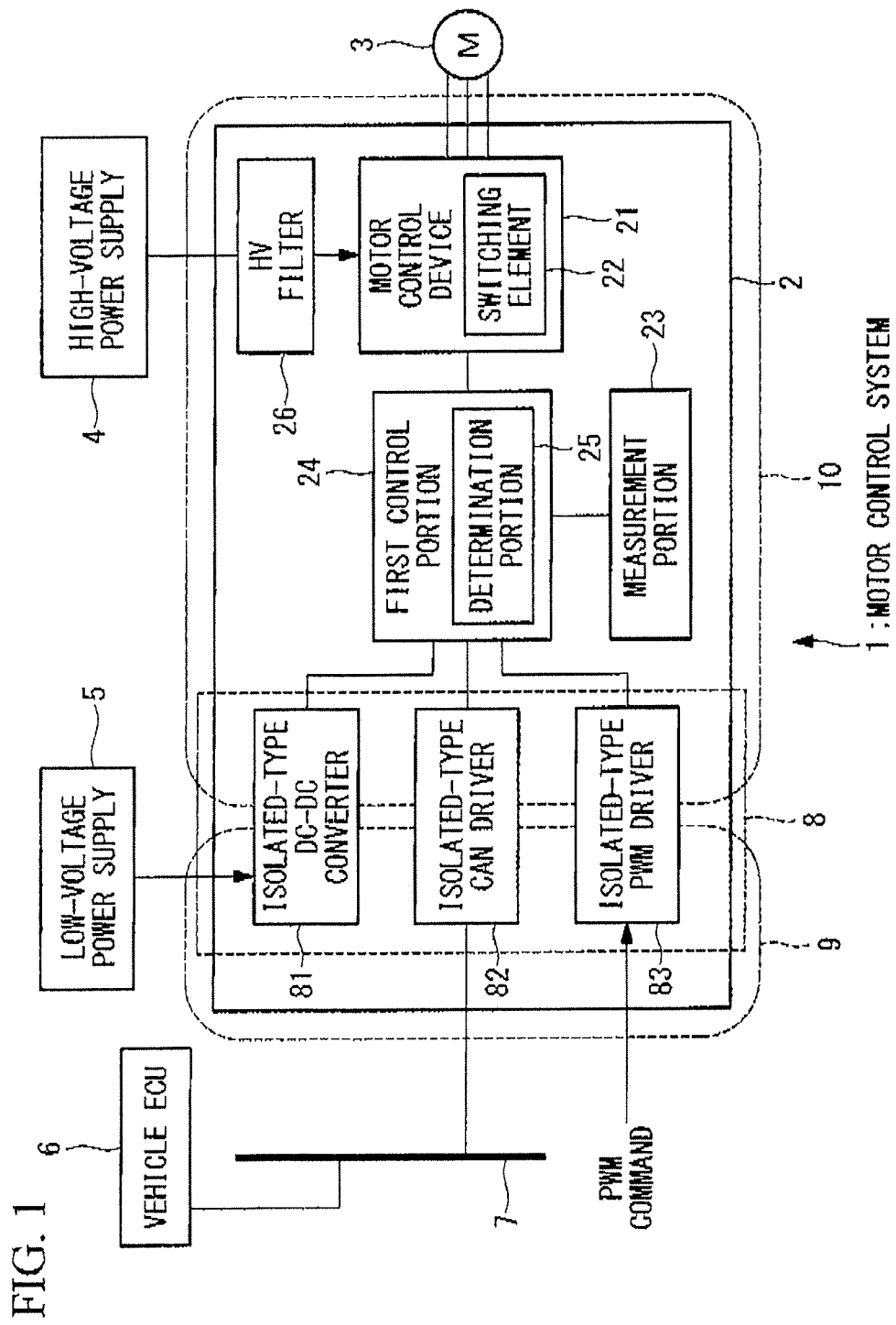
FIG. 1 is a schematic configuration diagram of a motor control system according to the present invention.

FIG. 1 is a schematic configuration diagram of a motor control system 1 of this embodiment.

As shown in FIG. 1, the motor control system 1 of this embodiment controls driving of a three-phase motor 3 that serves as a driving source of an in-vehicle heat-exchanger (radiator) cooling fan.

The motor control system 1 includes the three-phase motor 3 and an inverter system (vehicle cooling-fan motor/inverter system) 2.

The inverter system 2 includes a motor control device 21 that has a switching element 22, a measurement portion (measurement unit) 23, a first control portion (first control unit) 24, and an isolation portion (isolation unit) 8. The motor control device 21 converts direct current supplied from a high-voltage power supply 4, such as a high-voltage battery or a generator, into three-phase alternating current to drive the three-phase motor 3. The high-voltage power supply 4 has a voltage of 200 (V) or 400 (V), for example, and supplies power to the motor control device 21 via an HV filter 26.

Here, the switching element 22 is a power transistor formed of a semiconductor device, and, for example, a MOSFET, a bipolar transistor, an IGBT, or the like is used. Furthermore, an Si-based semiconductor or an SiC-based semiconductor is used as a semiconductor material.

A low-voltage power supply 5 is an in-vehicle battery power supply or the like and supplies a voltage of 12 (V), for example.

The motor control system 1 is connected to a vehicle network CAN (Controller Area Network) 7, which is a vehicle network and which is a type of communication for communicating with the vehicle. Thus, the inverter system 2 is provided with an isolated-type CAN driver (communication control unit) 82 that forms a control communication circuit, and a communication cable from a superordinate vehicle ECU (Electric Control Unit) (second control unit) 6, which is provided in the vehicle, can be connected thereto.

Note that, in this embodiment, although a description will be given of an example case in which CAN is used as a vehicle network, another system, for example, LIN (Local Interconnect Network) or FlexRay, can be used, and the vehicle network is not particularly limited.

The isolation portion 8 electrically isolates a low-voltage system 9, to which power is supplied from the low-voltage power supply 5, from a high-voltage system 10, to which power is supplied from the high-voltage power supply 4. Furthermore, the isolation portion 8 is activated by using power supplied from the low-voltage power supply 5 and specifically includes an isolated-type DC-DC converter 81, the isolated-type CAN driver 82, and an isolated-type PWM driver (PWM control unit) 83.

The isolated-type DC-DC converter 81 supplies power from the low-voltage power supply 5 to the motor control device 21 and the first control portion 24. Furthermore, the isolated-type DC-DC converter 81 is used for a driving voltage (for example, 5 (V)) for the first control portion 24 and a driving voltage (for example, 15 (V)) for the motor control device 21.

The isolated-type CAN driver 82 is connected to the vehicle network CAN 7, is connected to the vehicle ECU 6 via the vehicle network CAN 7, and allows information exchange between the vehicle ECU 6 and the first control portion 24.

Figure 2:
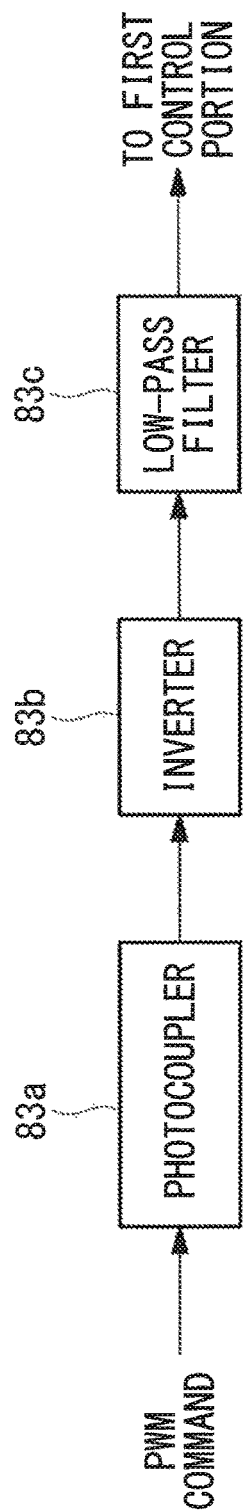
FIG. 2 is a functional block diagram showing an example isolated-type PWM driver of this embodiment.

The isolated-type PWM driver 83 is activated by using power supplied from the low-voltage power supply 5, performs PWM control in response to the duty, and controls the switching element 22 of the motor control device 21. FIG. 2 shows an example of the isolated-type PWM driver 83. As shown in FIG. 2, the isolated-type PWM driver 83 is composed of a photocoupler 83a, an inverter 83b, and a low-pass filter 83c. A PMW command is input to the photocoupler 83a and is converted to an analog value from 0 to 5 (V) indicating the duty, which is output to the first control portion 24 as a rotation-speed instruction.

The first control portion 24 controls the motor control device 21. Specifically, the first control portion 24 obtains a rotation-speed instruction for the three-phase motor 3 via at least one of the isolated-type PWM driver 83 and the isolated-type CAN driver 82 and controls the three-phase motor 3 based on the obtained rotation-speed instruction.

The first control portion 24 includes a determination portion 25. The determination portion 25 determines whether there is a fault in the switching element 22, based on at least one of the temperature value, the current value, and the voltage value obtained from the measurement portion 23. Specifically, the determination portion 25 has thresholds for the temperature value, the current value, and the voltage value, determines that there is a fault when the values exceed predetermined thresholds, and outputs a determination result to the vehicle ECU 6 via the vehicle network CAN 7.

Furthermore, when a fault in the switching element 22 is detected, the first control portion 24 outputs fault information notifying that there is a fault in the switching element 22 to the vehicle ECU 6 via the isolated-type CAN driver 82.

The measurement portion 23 measures at least one of the temperature value, the current value, and the voltage value of the switching element 22 of the motor control device 21 and outputs it to the first control portion 24. For example, because the temperature of the switching element 22 is increased when the three-phase motor 3 or the switching element 22 of the motor control device 21 has a fault, a change in the temperature of the switching element 22 is detected by the measurement portion 23, and whether there is a fault is determined in the first control portion 24.

Next, the operation of the motor control system 1 of this embodiment will be described.

DC power supplied from the high-voltage power supply 4, which is mounted in the vehicle, to the motor control device 21 is converted into three-phase alternating current and is then supplied to the three-phase motor 3, thus driving the three-phase motor 3. The inverter system 2 is controlled based on a rotation-speed instruction for the three-phase motor 3 that is obtained, via the isolated-type CAN driver 82, from the vehicle ECU 6, which is mounted in the vehicle, or a rotation-speed instruction for PWM control that is obtained via the isolated-type PWM driver 83.

Accordingly, the three-phase motor 3 is rotationally driven, thus activating the radiator cooling fan.

The temperature value, the current value, and the voltage value of the switching element 22 are measured, and measurement results are output to the first control portion 24. Then, the determination portion 25 of the first control portion 24 compares the measurement results with the predetermined thresholds, and, if the measurement results exceed the predetermined thresholds, notifies the vehicle ECU 6 of fault information via the vehicle network CAN 7.

When the vehicle ECU 6, which is a vehicle control circuit, obtains the fault information from the inverter system 2 via the vehicle network CAN 7, the occurrence of a fault in the radiator cooling fan is detected. The occurrence of a fault in the radiator cooling fan is presented through a presentation portion (not shown) or the like, thereby making it possible for a driver of the vehicle to become aware of the fault.

As described above, in the inverter system 2, the control method therefor, and the program therefor according to this embodiment, when a fault occurs in the motor control device 21, fault information is notified to the vehicle via the isolated-type CAN driver 82; therefore, it is possible to detect, at the vehicle, a fault in the three-phase motor 3, which drives the cooling fan, and to assist in identifying the cause of the fault. Furthermore, by using the three-phase motor 3 to drive the cooling fan, it is possible to achieve low-loss and high-efficiency driving. Furthermore, to drive the three-phase motor 3, power is supplied from the high-voltage power supply (for example, 200 to 400 (V)) 4. Thus, compared with a case in which power is supplied from the low-voltage power supply 5, which is a low-capacity battery (for example, 12 (V)) of the vehicle, it is not necessary to use the voltage of the low-capacity battery to drive the motor, and thus there is no need to worry about battery consumption.

REFERENCE SIGNS LIST 1 motor control system
2 inverter system (vehicle cooling-fan motor/inverter system)
3 three-phase motor
6 vehicle ECU (second control unit)
7 vehicle network CAN
8 isolation portion (isolation unit)
21 motor control device
22 switching element
23 measurement portion (measurement unit)
24 first control portion (first control unit)
81 isolated-type DC-DC converter
82 isolated-type CAN driver (communication control unit)
83 isolated-type PWM driver (PWM control unit)

The invention claimed is:

1. A vehicle cooling-fan motor/inverter system that controls a three-phase motor that drives a cooling fan for supplying air to an in-vehicle heat exchanger, comprising:
a motor control device that has a switching element, that converts DC power supplied from a high-voltage power supply into three-phase AC power, and that supplies the three-phase AC power to the three-phase motor;
a communication driver that is activated by using power supplied from a low-voltage power supply and that exchanges information, via a vehicle network, with a second control unit that is mounted in a vehicle and that is on a superordinate side to the vehicle cooling-fan motor/inverter system;
an isolation unit that electrically isolates a low-voltage system to which power is supplied from the low-voltage power supply from a high-voltage system to which power is supplied from the high-voltage power supply;

a PWM driver that is activated by using power supplied from the low-voltage power supply, and that receives a PWM signal from a channel different from the vehicle network and outputs a rotation-speed instruction for the three-phase motor; and a first control unit that obtains a rotation-speed instruction for the three-phase motor via the PWM driver and the communication driver and that controls the motor control device based on the obtained rotation-speed instruction for the three-phase motor, wherein, if a fault in the switching element is detected, the first control unit outputs fault information notifying that there is a fault in control of the three-phase motor to the second control unit via the communication driver.

2. A vehicle cooling-fan motor/inverter system according to claim 1, further comprising:

a measurement unit that measures and outputs at least one of a temperature value, a current value, and a voltage value of the switching element of the motor control device, wherein the first control unit includes a determination unit that determines whether there is a fault in the switching element based on at least one of the temperature value, the current value, and the voltage value obtained from the measurement unit.

3. A control method for a vehicle cooling-fan motor/inverter system that controls a three-phase motor that drives a cooling fan for supplying air to an in-vehicle heat exchanger, the vehicle cooling-fan motor/inverter system including: a motor control device that has a switching element, that converts DC power supplied from a high-voltage power supply into three-phase AC power, and that supplies the three-phase AC power to the three-phase motor; a communication driver that is activated by using power supplied from a low-voltage power supply and that exchanges information, via a vehicle network, with a second control unit that is mounted in a vehicle and that is on a superordinate side to the vehicle cooling-fan motor/inverter system; an isolation unit that electrically isolates a low-voltage system to which power is supplied from the low-voltage power supply from a high-voltage system to which power is supplied from the high-voltage power supply, a PWM driver that is activated by using power supplied from the low-voltage power supply; and that receives a PWM signal from a channel different from the vehicle network and outputs a rotation-speed instruction for a three-phase motor; and a first control unit that control the motor control device, the control method comprising:

configuring the first control unit to obtain a rotation-speed instruction for the three-phase motor via the PWM driver and the communication driver, controlling, by the first control unit, the motor control device based on the obtained rotation-speed instruction for the three-phase motor; and outputting, by the first control unit, fault information notifying that there is a fault in control of the three-phase motor to the second control unit via the communication driver if a fault in the switching element is detected.

* * * * *